United States Patent

Rusiñol et al.

[11] Patent Number: 5,853,580
[45] Date of Patent: Dec. 29, 1998

[54] FILTER FOR ELECTRIC PUMPS OF AUTOMOBILE VEHICLE WINDSCREEN WASHERS

[75] Inventors: Luis Boguña Rusiñol; Miguel Mota Lopez, both of Rubi, Spain

[73] Assignee: Fico Transpar, S.A., Barcelona, Spain

[21] Appl. No.: 849,915

[22] PCT Filed: Sep. 16, 1996

[86] PCT No.: PCT/ES96/00177

§ 371 Date: Jun. 3, 1996

§ 102(e) Date: Jun. 3, 1996

[87] PCT Pub. No.: WO97/13663

PCT Pub. Date: Apr. 17, 1997

[30] Foreign Application Priority Data

Oct. 10, 1995 [ES] Spain ............................ 9501954

[51] Int. Cl.[6] .................. B01D 35/027; B01D 29/33; B60S 1/48; F04D 29/70
[52] U.S. Cl. ................ 210/172; 210/416.1; 210/498; 210/497.01
[58] Field of Search ..................... 210/172, 416.1, 210/450, 452, 448, 460, 498, 497.01

[56] References Cited

U.S. PATENT DOCUMENTS 2,684,632  7/1954  Horton .
4,444,358  4/1984  Spohn .
4,824,021  4/1989  Binder .

Primary Examiner—Thomas M. Lithgow
Attorney, Agent, or Firm—Michael J. Striker

[57] ABSTRACT

This filter for electric pumps of windscreen washers is of generally hollow cylindrical shape open at one of its ends, the rear (13) provided with structure (14) for the coupling of an electric pump (2) with a cleaning liquid reservoir (3), and is designed to house the tubular aspiration extension (9) of an electric pump (2). At its front end (21), the filter has, to the side, a plurality of through orifices (20) forming two reticula facing each other, and to the front a plurality of through orifices (22) forming a reticulum. To the interior the filter forms an intermediate chamber (23) in which is arranged the free end of the axial extension (9) and into which there emerge the side (20) and front (22) through orifices.

1 Claim, 1 Drawing Sheet

FILTER FOR ELECTRIC PUMPS OF AUTOMOBILE VEHICLE WINDSCREEN WASHERS

TECHNICAL FIELD OF THE INVENTION

The invention relates to a filter for electric pumps of automobile vehicle windscreen washers. More specifically, the invention relates to an intake filter applicable to electric pumps coupled to reservoirs of cleaning liquid for the glazed surfaces of automobile vehicles.

BACKGROUND OF THE INVENTION

As is known, the electric pumps fitted ex-works to automobile vehicles for cleaning their glazed surfaces, and specifically the windscreen, rear window and often the headlights, comprise a suction-impulsion pump which draws in cleaning liquid contained in a reservoir provided for the purpose and impels it through ducts until it reaches jets which project it against said glazed surfaces.

The known embodiments of electric pumps comprise, in summary, a casing of generally elongated cylindrical shape in which are axially arranged a suction-impulsion pump and an electric drive pump connected to the electrical network of the vehicle. The suction-impulsion pump comprises an impulsion chamber in which is mounted an aspiration-impulsion turbine, with liquid entering the impulsion chamber through a tubular axial suction extension provided at its free end with transverse intake openings, the aspired liquid being discharged through an outlet nozzle arranged tangentially with respect to the impulsion chamber. The electric pump is coupled to the cleaning liquid reservoir by means of the axial tubular aspiration extension fitted inside the reservoir.

In order to prevent the aspiration of solid bodies contained in the cleaning liquid while the electric pump is running, the usual practice is to couple a filtering element to the axial tubular aspiration extension. The filtering element is made of elastic material and generally consists in a hollow cylindrical body open at one of its ends which, like a sheath, contains the axial tubular extension with a tight fit and pressing upon it over its entire length, while at its open end are arranged means for leaktight coupling of the electric pump and the reservoir, while at its other end, which is closed, there are to the side and front a plurality of orifices for the passage of the aspirated cleaning liquid, these orifices being so dimensioned as to retain those solid particles which might affect normal operation of the electric pump or block the liquid outlets of the aforesaid jets. In order to lend the filtering element suitable mechanical strength the side through orifices are arranged to form two diametrically opposed reticula.

The known embodiments of filtering elements such as those described above have as their main disadvantage the fact that said arrangement of side through orifices involves a need, during coupling of the filtering element with the axial tubular aspiration extension, to have said two through orifice reticula opposite the transverse aspiration openings, for otherwise said openings are blocked, totally or partially, by the side-wall portions of the filtering element which do not have side through orifices, thereby leading to loss of flow of aspirated cleaning liquid and preventing projection of same at the pressure and flow required for cleaning of the aforesaid glazed surfaces.

DESCRIPTION OF THE INVENTION

A filter for electric pumps of automobile vehicle windscreen washers of new structure and operation is made known hereby in order to provide a solution to the disadvantages presented by the known embodiments of filtering elements such as those described above, which specifically call for correct positioning of the filtering element with respect to the transverse aspiration openings of the axial tubular aspiration extension of electric pumps during their mutual coupling.

The filter for electric pumps of automobile vehicle windscreen washers of the invention can be coupled to electric pumps made up essentially of a casing in which is fitted axially a suction-impulsion pump and an electric drive motor, the suction-impulsion pump comprising an impulsion chamber, in which there is an aspiration-impulsion turbine, provided with an axial tubular aspiration extension fitted at its free end with transverse aspiration openings, and an output nozzle tangentially arranged with respect to the impulsion chamber. Coupling of the electric pump with the cleaning liquid reservoir is implemented by means of the axial tubular aspiration extension through a filter which, made from elastic material, has a generally hollow cylindrical shape open at one of its ends and designed to house the axial tubular aspiration extension, in which, at its rear end, the end which is open, it has means for the leaktight coupling of the electric pump with the cleaning liquid reservoir, and at its front end, the end which is closed, it has to the side a plurality of through orifices arranged, preferably, forming two regular reticula diametrically opposed with respect to each other, and to the front a plurality of through orifices forming a regular reticulum.

The filter of the invention is characterized in that, to the interior, it forms two coaxial cylindrical portions of different diameter linked to each other, at the rear and the front respectively, in which, when the filter is coupled to the axial tubular aspiration extension, the rear portion, which is of smaller diameter, presses by elastic reaction on the axial tubular aspiration extension, while on the front portion, which is of larger diameter, is arranged the free end of the axial extension forming an intermediate chamber into which there emerge the side and front through orifices.

The aforesaid characteristics of the filter of the invention provide a solution to the problems presented by the known embodiments of filters for electric pumps for windscreen washers. Indeed, in the filter of the invention, the intermediate chamber permits the transverse aspiration openings to occupy any position with respect to the side passage openings, practically without affecting the suction capacity of the electric pump, since, independently of the position of the transverse openings with respect to the side through orifices, the liquid drawn in through the latter and circulating through the intermediate chamber reaches the transverse aspiration openings where it is added to the flow of cleaning liquid drawn through the front through orifices.

BRIEF DESCRIPTION OF THE DRAWINGS

The drawing sheets for this specification show the filter for electric pumps of automobile vehicle windscreen washers object of the invention. In said drawings.

DETAILED DESCRIPTION OF THE EXAMPLE OF EMBODIMENT

Figure 1:
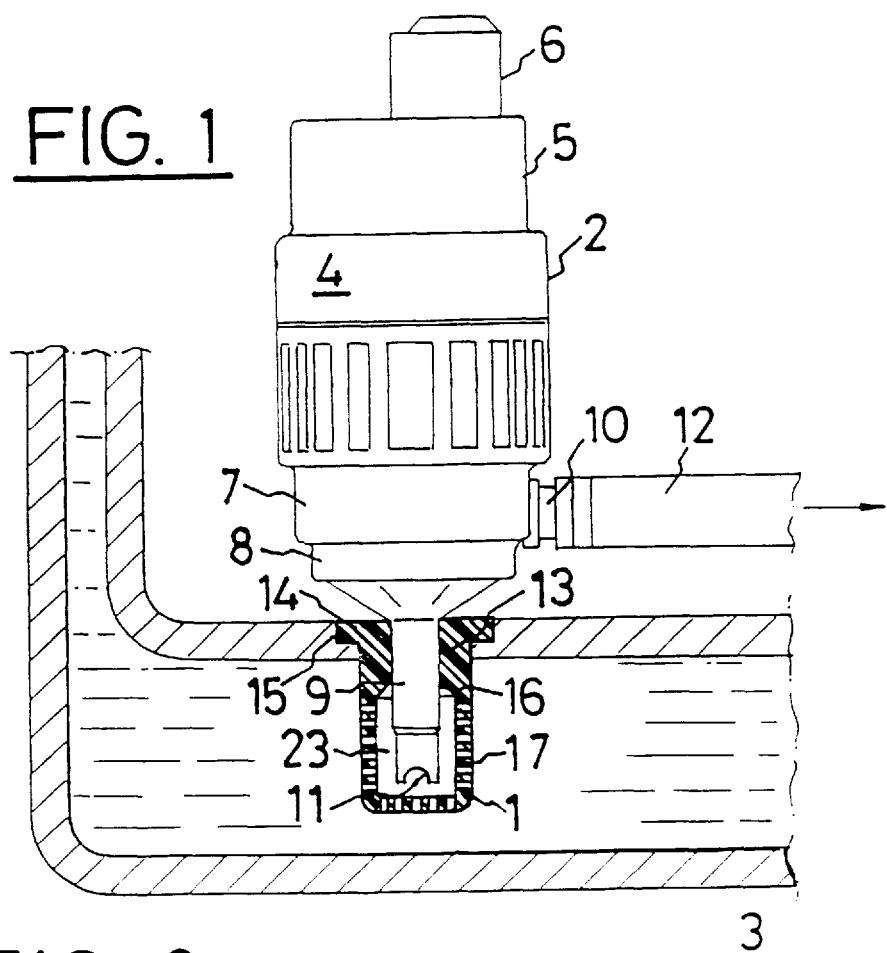
FIG. 1 is a view showing the coupling of an electric pump with a cleaning liquid reservoir by means of the filter of the invention.

The filter for electric pumps of automobile vehicle windscreen washers object of the invention described as an example of embodiment includes an filter 1 which, as shown in FIG. 1, permits leaktight coupling of an electric pump 2 with a cleaning liquid reservoir 3 shown partially.

FIG. 1 shows how the electric pump 2 comprises a casing 4 of generally elongated cylindrical shape, preferably made of plastic material, which contains axially arranged a suction-impulsion pump and an electric drive motor, neither of which is shown. At its upper end 5, the casing 4 forms a prismatic extension 6 designed to receive a terminal, not shown, for connection of the electric pump with the electrical network of the vehicle, while at its lower end 7 the casing 4 forms an impulsion chamber 8, constituting the suction-impulsion pump, in which is housed an aspiration-impulsion turbine, not shown, an axial tubular aspiration extension 9 shown by means of broken lines in FIGS. 2 and 3, and a cleaning liquid outlet nozzle 10 tangentially mounted with respect to the impulsion chamber 8. The free end of the axial tubular aspiration extension 9 has two transverse aspiration openings 11 opposite each other, while the free end of the outlet nozzle 10 is designed to receive and secure the corresponding end of a distributor duct 12 for the impelled cleaning liquid.

The cleaning liquid reservoir 3 shown in FIG. 1 is preferably made from plastic material and is fixed to the structure of the automobile vehicle. Both the cleaning liquid reservoir and the electric pump 1 can adopt any other configuration suited to each specific case of application without thereby affecting the essential nature of the invention.

The filter 1 is preferably made from plastic material and, as shown in the drawing sheets, has a generally elongated hollow cylindrical shape open at its back end 13 which, as shown in FIG. 1, has a perimetral rim 14 designed to be inserted by pressure into a coupling orifice 15 made for the purpose in the cleaning liquid reservoir 3.

The above outline of the example of embodiment and application of the filter of the invention is known and widely used for known embodiments of filters for windscreen washer electric pumps.

Figure 2:
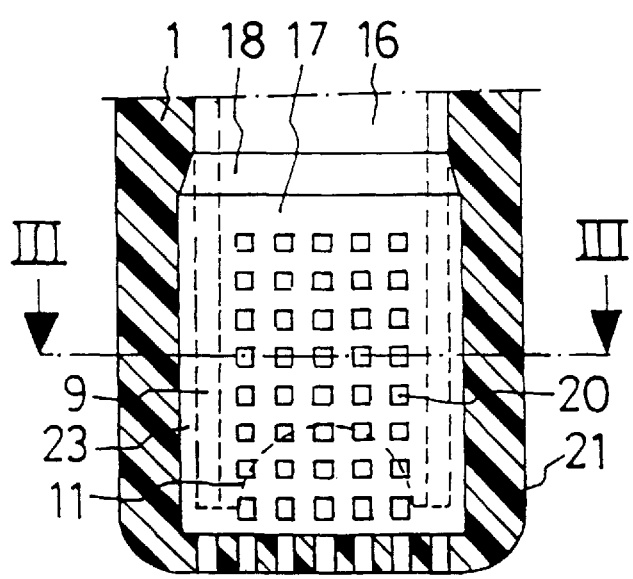
FIG. 2 is a partial view of the filter of the invention in longitudinal section.
Figure 3:
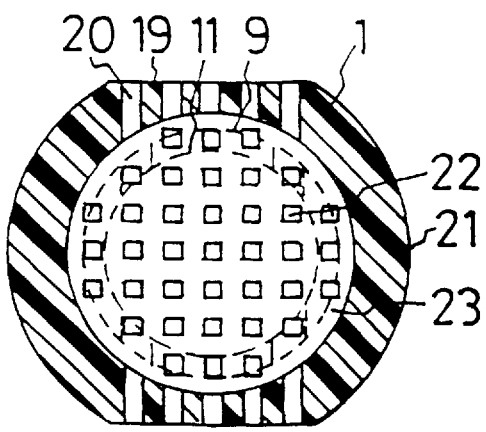
FIG. 3 is a view along section III—III taken from FIG. 2.

FIG. 2 shows how to the interior the filter 1 forms two coaxial cylindrical portions of different diameter; the rear portion 16, which is the one of smaller diameter, and the front portion 17, respectively, linked by means of a frustum portion 18. The rear part 16 is of dimensions such that when the filter 1 is coupled with the axial tubular aspiration extension 9 the latter is submitted to compression by elastic reaction of the former, leaving the electric pump 2 fixed to the reservoir 3 through the coupling of the filter 1, as shown in FIG. 1. FIG. 3 shows how the front portion 18 forms to the exterior two lateral planes 19 arranged diametrically and having made in them a plurality of side through orifices 20 arranged to form a respective regular reticulum shown in FIG. 2, while FIGS. 2 and 3 show how the filter 1 has at its closed front end 21 a plurality of frontal through orifices 22 arranged to form a regular reticulum shown in FIG. 3. When the filter 1 and the axial tubular aspiration extension 9 are coupled together, the front portion 18 forms an intermediate chamber 23 into which there emerge the side through orifices 20 and the frontal through orifices 22.

The figures of the drawing sheets show how the layout of the intermediate chamber 23, during coupling of the filter 1 with the axial tubular aspiration extension 9, permits the transverse aspiration openings 11 to occupy any position with respect to the side through orifices 20, practically without affecting the suction capacity of the electric pump 1; in this respect, FIG. 1 shows how the transverse aspiration openings 11 are arranged at a quarter-turn with respect to the side through orifices 20, while FIGS. 2 and 3 show how the openings 11 are arranged facing the side through orifices 20, it being understood that the transverse openings 11 can with respect to the side through orifices 20 occupy any intermediate position between said two positions.

We claim:

1. A filter for electric pumps of automobile vehicle wind screen washers which can be coupled to electric pumps, the filter comprising a filter body formed as a sole piece of elastic material of a generally hollow cylindrical shape and having an open rear end provided with means for a leak-tight coupling of an electric pump with a cleaning liquid reservoir and also having a front end which is closed, said filter body having at a side a plurality of through orifices which form two regular reticula diametrically opposite to one another, said filter body having at a front a plurality of further through orifices forming a regular reticulum, said filter body at its interior forming two coaxial cylindrical portions which are linked to each other and include a rear portion and a front portion of different diameters, said rear portion having a smaller diameter and being pressed by elastic reaction on an axial tubular aspiration extension, while said front portion has a larger diameter and is arranged at a free end of the axial tubular aspiration extension to form an intermediate chamber into which said first mentioned through orifices and said further through orifices emerge.

* * * * *